(12) United States Patent
Canioncq et al.

(10) Patent No.: US 11,685,197 B2
(45) Date of Patent: Jun. 27, 2023

(54) TIRE WEAR ESTIMATION (71) Applicant: Melexis Technologies SA, Bevaix (CH)

(72) Inventors: Julien Canioncq, Metabief (FR); Ivan Zagan, Brussels (BE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 16/881,797

(22) Filed: May 22, 2020

(65) Prior Publication Data
US 2020/0369093 A1 Nov. 26, 2020

(30) Foreign Application Priority Data

May 23, 2019 (EP) ..................................... 19176323

(51) Int. Cl.
B60C 11/24 (2006.01)
(52) U.S. Cl.
CPC .......... B60C 11/246 (2013.01); B60C 11/243 (2013.01)
(58) Field of Classification Search
None
See application file for complete search history.

(56) References Cited

U.S. PATENT DOCUMENTS

| 6,278,361 B1* | 8/2001 | Magiawala | B60C 23/0494 340/438 |
| 8,558,680 B2 | 10/2013 | Pannek | |
| 9,513,192 B2 | 12/2016 | Kretschmann et al. | |
| 2005/0080587 A1* | 4/2005 | Giustino | B60T 8/1725 702/127 |
| 2013/0278406 A1* | 10/2013 | Weston | B60C 23/0488 340/442 |
| 2015/0247780 A1* | 9/2015 | Kretschmann | B60C 23/064 73/146.5 |
| 2018/0244116 A1* | 8/2018 | Zhuk | B60C 23/0489 |

FOREIGN PATENT DOCUMENTS

| DE | 102004016488 A1 | 10/2005 |
| EP | 3366499 A1 | 8/2018 |
| FR | 2951111 A1 | 4/2011 |
| WO | 2014/016195 A1 | 1/2014 |

OTHER PUBLICATIONS

European Search Report in Corresponding EP Application No. 19176323.4, dated Oct. 25, 2019.

* cited by examiner

Primary Examiner — Paul M. West
Assistant Examiner — Mark A Shabman
(74) Attorney, Agent, or Firm — Workman Nydegger (57) ABSTRACT

A tire wear estimator includes a tire measurement system adapted to be mounted in or on an inner surface of the tire. The tire measurement system comprises a sensor adapted for sensing a physical property of the tire, and an acquisition system adapted for sampling a signal of the sensor into memory, to acquire a perturbation in the sampled data induced by a contact patch of the tire when the sensor is mounted in or on an inner surface of the tire. A sample rate of the acquisition system is high enough so at least one oscillation, which indicates a tread depth of the tire, becomes detectable in the sampled data in and/or around the perturbation.

14 Claims, 6 Drawing Sheets

TIRE WEAR ESTIMATION

FIELD OF THE INVENTION

The invention relates to the field of tire mounted sensors (TMS). More specifically it relates to systems and methods which are adapted to estimate the wear of the tire.

BACKGROUND OF THE INVENTION

Tire tread depth is critical for car safety and it would be of great interest to have a measurement technique so that the car and/or the driver can be informed of the tire condition.

Some prior art solutions for measuring the tire tread depth are intrusive to the tire.

Other prior art solutions may for example be based on a rotation counter. These solutions may however suffer from a lack of accuracy.

Still other solutions are related to contact patch acquisitions with accelerometers. One example thereof is disclosed in U.S. Pat. No. 8,558,680B2. In this patent a method is disclosed for determining a vehicle tire tread depth. The method comprises determining a tire contact area using a sensor which is situated in or on the vehicle tire, and calculating a tire revolution time based on an amount of time that a section of the tire containing the at least one sensor spends in the tire contact area.

Figure 1:
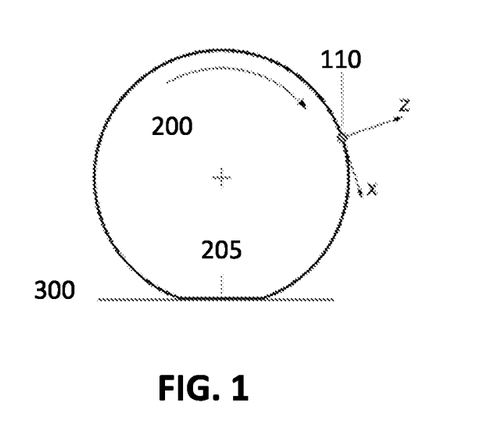
FIG. 1 shows a schematic drawing of a tire in which a sensor is mounted.

Tire mounted sensors are mounted in or on an inner surface of a tire. An example of a tire 200 in which a sensor 110 is mounted is schematically illustrated in FIG. 1. The sensor is mounted at a certain position of the tire 200. The time period during which this position is part of the contact patch 205 between the tire 200 and the road surface 300 a perturbation will occur in the signal generated by the tire mounted sensor.

The method of U.S. Pat. No. 8,558,680B2 comprises determining the tire tread depth as a function of the tire contact area.

There is a need for alternative systems and methods for obtaining an estimate of the tire tread depth in a non-intrusive way.

SUMMARY OF THE INVENTION

It is an object of embodiments of the present invention to provide a good system and method for measuring tire wear in a way which is non-intrusive to the tire.

The above objective is accomplished by a method and device according to the present invention.

In a first aspect embodiments of the present invention relate to a tire wear estimator which comprises a tire measurement system which is adapted to be mounted in or on an inner surface of the tire. The tire measurement system comprises a sensor adapted for sensing a physical property of the tire, and an acquisition system adapted for sampling a signal of the sensor into memory. In embodiments of the present invention the acquisition system is adapted for sampling the signal of the sensor such that at least a perturbation in the sampled data, which is induced by a contact patch of the tire when the sensor is mounted in or on an inner surface of the tire, is acquired. In embodiments of the present invention the sample rate of the acquisition system is high enough such that at least one oscillation, which is indicative of a tread depth of the tire, becomes detectable in the sampled data in and/or around the perturbation.

In embodiments of the present invention the tire measurement system may comprise a communication system for wireless data transmission.

It is an advantage of that a tire wear estimator according to embodiments of the present invention that tire wear can be estimated in a non-intrusive way. This can be achieved by analyzing the perturbation in the sampled data or a processed version thereof.

In embodiments of the present invention the sensor is mounted in a tire or on an inner surface of the tire of the wheel. The sensor can for example be completely integrated in the tire (over-molded), or partially over molded, or attached/glued on the inner surface.

In embodiments of the present invention the tire wear estimator may be adapted for wirelessly transmitting the sampled data which comprises the at least one oscillation or a processed version of the sampled data.

The sampled data could be processed directly on the tire measurement system. In that case it may be that only the resulting tread depth value is communicated to the car, or even just a binary information indicating whether the tread depth is sufficient (OK) or not (KO).

In other embodiments it may be that the processing of the sampled data is done on a separate processing unit. In that case the sampled data may be transmitted by the communication system.

In embodiments of the present invention the sensor is an acceleration sensor.

In embodiments of the present invention the acquisition system comprises an analog to digital converter for sampling the signal of the sensor.

In embodiments of the present invention the tire wear estimator moreover comprises a processing unit adapted for estimating a tread depth of the tire by analyzing the at least one oscillation which is indicative of the tire tread depth.

In embodiments of the present invention the communication system is adapted for wirelessly transmitting the perturbation to the processing unit and the processing unit is adapted to be located outside the tire.

In embodiments of the present invention the processing unit is adapted to be mounted in or on the inner surface of the tire and the communication system is adapted for wirelessly transmitting the estimated tread depth.

In embodiments of the present invention the processing unit is adapted for analyzing the amplitude of the at least one oscillation for estimating the tread depth.

In embodiments of the present invention the processing unit is adapted for analyzing the frequency or period of the at least one oscillation for estimating the tread depth.

In embodiments of the present invention the sensor is adapted for measuring radial acceleration.

In embodiments of the present invention the sensor is adapted for measuring tangential acceleration.

In embodiments of the present invention the acquisition system is adapted to acquire the perturbation by storing the sampled data in a buffer in the memory, until a transmit delay after the perturbation is recognized, wherein the perturbation is recognized by comparing the stored data with at least one characterizing feature of the perturbation.

It is an advantage of embodiments of the present invention that the first perturbation in the data, starting from the moment the sensor system is acquiring the data, will be stored by the acquisition system in the buffer. Thus, faster acquisition is possible than in systems wherein at least two sequences need to be acquired in order to start the acquisition sequence and set the sleep period. In such prior art systems the acquisitions are synchronized (i.e specific timing is measured/calculated to ensure proper acquisition of the contact patch).

In embodiments of the present invention the characterizing features of the perturbation comprise leading edge and/or trailing edge conditions of the perturbation.

In a second aspect embodiments of the present invention relate to a method for estimating tire wear. The method comprises:
sampling data of a sensor, which is mounted in or on an inner surface of a tire, and which is adapted for sensing a physical property of the tire,
filling a buffer with the sampled data,
identifying a perturbation in the sampled data, which is induced when the part of the tire where the sensor is mounted hits the ground.

The sampling is done at a sample rate which is high enough such that at least one oscillation, which is indicative of the tire tread depth, becomes detectable in the sampled data in and/or around the perturbation.

In embodiments of the present invention the sampled data which comprises the at least one oscillation or a processed version of the sampled data may be transmitted.

In some embodiments of the present invention the at least one oscillation may be transmitted. In other embodiments of the present invention the at least one oscillation may be processed and only the obtained result may be transmitted. This result may for example be the tread depth or it may for example be a binary information indicating whether the tread depth is sufficient (OK) or not (KO).

In embodiments of the present invention a tread depth of the tire is estimated by analyzing the at least one oscillation in and/or around the perturbation.

In embodiments of the present invention acquiring the perturbation comprises comparing the data in the buffer with at least one characterizing feature of the perturbation for finding the perturbation in the data.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The current invention is using a tire mounted sensor (TMS) of the wheel to estimate the wear of the tire. The sensor is mounted in the tire on the inner liner, and is adapted for sensing a physical property of the tire. It is found by the inventors that the signal from the sensor during the contact patch can be used to estimate the tread depth. The sample rate at which the accelerometer signal is sampled must therefore be high enough such that at least one oscillation, which is indicative of a tread depth of the tire, is detectable in the sampled signal. It is noticed by the inventors that above a certain frequency the amplitude and the frequency of these at least one oscillation varies with the tire wear. It is found by the inventors that when sampling the data at a high enough rate, at least one oscillation can be monitored around and in the contact patch which are indicative for the tread depth.

In a first aspect embodiments of the present invention relate to a tire wear estimator 100. A tire wire estimator in accordance with embodiments of the present invention comprises a sensor 110 adapted for sensing a physical property of the tire, and an acquisition system adapted for sampling data of the sensor to acquire a perturbation in the sampled data which is induced by a contact patch of the tire when the sensor 110 is mounted in or on an inner surface of the tire.

In embodiments of the present invention the sample rate of the acquisition system 120 is high enough such that, when the sensor is mounted on a new tire, at least one oscillation in and/or around the perturbation, which is indicative of a tread depth of the tire, becomes detectable in the sampled data. The at least one oscillation may for example be induced by sliding tread blocks of the tire, when the wheel is rotating.

In embodiments of the present invention the tire wear estimator 100 may comprise a communication system 130 for wireless data transmission. This communication system may be used for transmitting the sampled data which comprises the at least one oscillation or for transmitting a processed version thereof.

The sensor may for example be an acceleration sensor, an ultrasonic sensor, a piezoelectric sensor, an optical sensor, a magnetic sensor, a deformation sensor or a shock sensor. Different sensors may be combined. A physical property of the tire may for example be a dynamic property. For example the perturbation may be measured using an acceleration sensor.

In embodiments of the present invention the tire wear estimator 100 moreover comprises a processing unit 140 which is adapted for estimating a tread depth of the tire by analyzing the at least one oscillation in the neighborhood of the perturbation which have a frequency higher than a characteristic frequency. This characteristic frequency may be tire dependent. The oscillations during the contact patch and those just before and just after the contact patch may be analyzed. Analyzing the data may for example be done a period of time before the perturbation, a period of time after the perturbation, and during the perturbation. This period depends on the speed of the vehicle. It may for example be at least half of the patch duration. This is for example typically 4 ms at 50 km/h. In embodiments of the present invention the measurement period may for example range between 1 to 30 ms, or even between 4 and 15 ms.

The characteristic frequency may be depending on the type of the tire. This characteristic frequency may be obtained by calibration for a specific tire. In embodiments of the present invention the characteristic frequency may for example be 200 Hz, or even 400 Hz, or even 800 Hz, or even 1 kHz, or even up to 5 kHz. Without being bound by theory, it is assumed that this frequency depends on the shape and the size of the tire blocks.

Depending on the characteristic frequency the minimum sample rate may be selected such that the at least one oscillation is detectable in the sampled signal. The acquisition system 120 may for example be adapted for sampling the sensor 110 at a sample rate which is minimally: 400 samples/second, or even 600 samples/second, or even 800 samples/second, or even 1000 samples/second, or even 2000 samples/second, or even 5000 samples/second, or even 7000 samples/second, or even 10000 samples/second, or even 20000 samples/second.

As discussed in the previous paragraph, the oscillations which are dependent on the depth of the tread are tire dependent and have a frequency of at least 200 Hz. Moreover they occur only just before, during, and just after the contact patch. In order to be able to monitor and analyze these oscillations, the sampling rate must be high enough and the contact patch acquisition must be accurate enough.

In embodiments of the present invention the acquisition of the data may be performed using an analog to digital converter (ADC). This ADC converts an analog signal from the sensor into digitized data. The acquisition system samples the data from the analog to digital converter and stores it in a buffer. The ADC may for example have a resolution between 12 and 18 bits, for example 16 bits.

Figure 2:
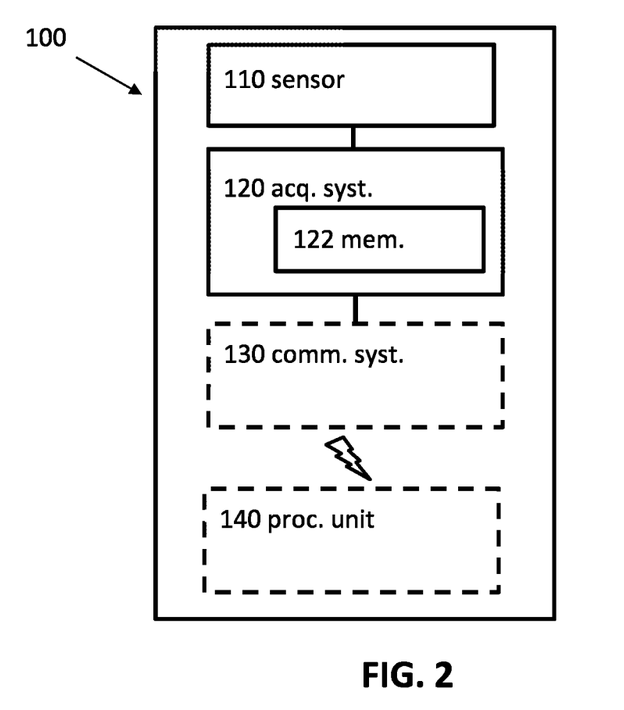
FIG. 2 shows a block diagram of a tire wear estimator which is adapted for wirelessly transmitting sampled data in and/or around the perturbation in accordance with embodiments of the present invention.
Figure 3:
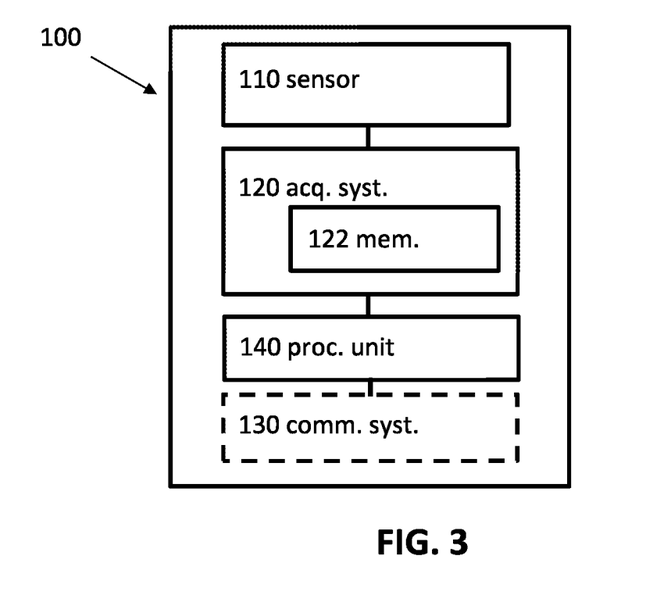
FIG. 3 shows a block diagram of a tire wear estimator which is adapted for wirelessly transmitting a processed version of the sampled data in and/or around the perturbation, in accordance with embodiments of the present invention.

Block diagrams of the different components of tire wear estimators in accordance with embodiments of the present invention are shown in FIG. 2 and FIG. 3.

In FIG. 2 a tire wear estimator 100 is shown in which the processing unit 140, which is adapted for estimating a tread depth of the tire by analyzing at least one oscillation in and/or around the perturbation, is adapted to be located outside the tire. In this example, the tire wear estimator 100 comprises a communication system 130 adapted for wirelessly transmitting the perturbation data to the processing unit 140. In embodiments of the present invention an engine control unit may be programmed such that it is adapted for estimating a tread depth of the tire by analyzing at least one oscillation in the perturbation, in accordance with embodiments of the present invention.

In FIG. 3 a tire wear estimator is shown in which the processing unit 140, which is adapted for estimating a tread depth of the tire by analyzing at least one oscillation in and/or around the perturbation, is adapted to be located on an inner surface of the tire. It may be part of a tire measurement system comprising the sensor 110 and the acquisition system 120. The tire wear estimator comprises a communication system 130 which is adapted for wirelessly transmitting the tread depth.

The wireless transmission may for example be radio frequency (RF) transmission or Bluetooth low energy (BLE) transmission.

When a sensor 110 (e.g. acceleration sensor), according to embodiments of the present invention, is mounted in or on an inner surface of the tire, it will rotate together with the tire. The contact between the tire and the ground results in a deformation of the tire. This deformation results in an additional change of the measured property of the tire (e.g. an additional change in the acceleration of the sensor). Hence, a perturbation will be present in the data from the sensor. This perturbation is induced by the contact patch nearby the sensor. Acquiring the sensor data during this contact patch period is also referred to as contact patch acquisition.

In embodiments of the present invention the tread depth is estimated trough the at least one oscillation on an accelerometer signal during a contact patch. The inventors have observed high-frequency oscillations in or around the contact patch period. These oscillations are indicative of the tire tread depth. In order to monitor these oscillations a fast acquisition without moving average is required. The required frequency is dependent on the tire characteristics. This characteristic frequency may be determined by calibration of a specific type of tire. Also the relationship between the oscillations and the trad depth may be determined by calibration of a specific type of tire.

Figure 4:
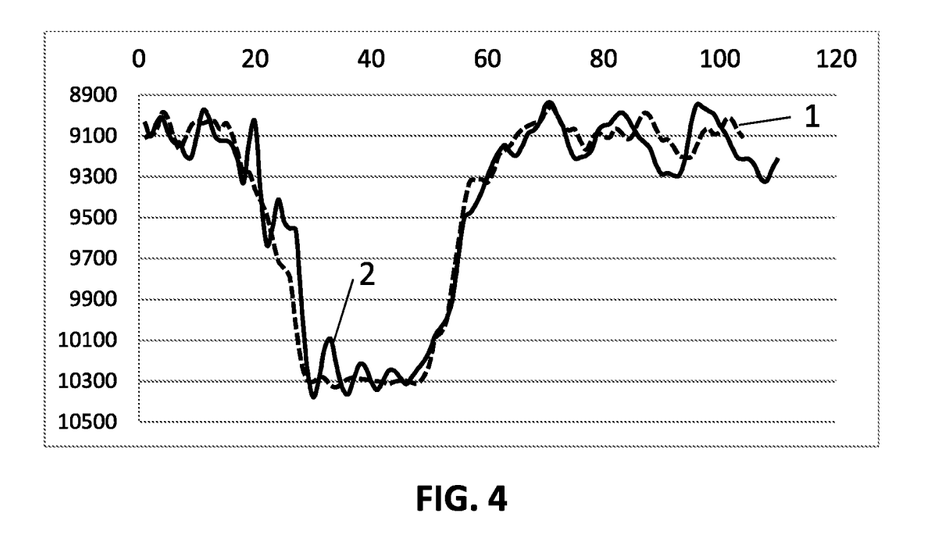
FIG. 4 shows the amplitude of the acceleration in function of time of a radial acceleration sensor, in accordance with embodiments of the present invention, and this for a new tire and for a worn tire.

FIG. 4 shows the amplitude (in arbitrary units) of the acceleration in function of time (sample number) for a radial acceleration sensor (accelerations in the direction of the z-axis in FIG. 1). The perturbation in the signal is induced by the patch contact nearby the sensor. The acceleration is shown for a new tire (2) and for a worn tire (1). In this figure it can be seen that the oscillations and amplitude of the oscillation are higher on a new tire (2) than on a worn tire (1). The frequency of these oscillations may be in the order of 1 kHz.

Figure 5:
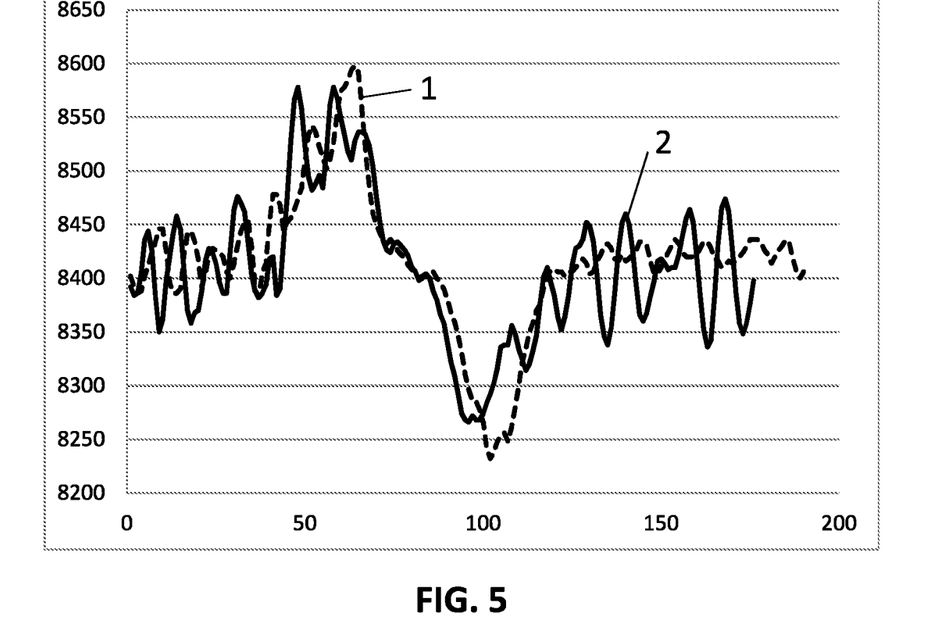
FIG. 5 shows the amplitude of the acceleration in function of time of a tangential acceleration sensor, in accordance with embodiments of the present invention, and this for a new tire and for a worn tire.

FIG. 5 shows the amplitude (in arbitrary units) of the acceleration in function of time (sample number) of a tangential acceleration sensor (accelerations in the direction of the x-axis in FIG. 1). The amplitude of the oscillations after the trailing edge of the perturbation is higher for a new tire (2) than for a worn tire (1).

In embodiments of the present invention the processing unit may be adapted for estimating a tread depth of the tire by analyzing the oscillation period or frequency or the amplitude, or a combination thereof, of the oscillations in and/or around the perturbation. This may be achieved by determining the zero crossings or by calculating a Fast Fourier Transform (FFT). The tread depth may for example be determined with a mathematical relation with an input parameter being the oscillation period or amplitude. In another embodiment, the period and the amplitude may be combined to form the input parameter of the equation. The equation may for example be a linear or a polynomial function. These functions may be tire dependent and predefined depending on the tire type.

In embodiments of the present invention the sampling rate of the acquisition system may for example be higher than a frequency of an oscillation indicative of a tread depth of the tire, wherein this oscillation is present in the sampled data in and/or around the perturbation. The sampling rate may for example be twice this frequency or higher.

In embodiments of the present invention estimating a tread depth may comprise fitting the sensor data (e.g. acceleration data) with a model. Model parameters can be specific to the tire. These parameters may be calibrated in advance and stored in the tire wear estimator. This may be in the tire measurement system which is to be mounted on the inner liner of the tire or it may be in a processing unit outside the tire, depending on where the processing for estimating the tread depth is done.

In embodiments of the present invention the acquired data is stored in memory 122 (see for example the memory 122 of the acquisition system 120 in FIG. 2 and FIG. 3). The storage may be done in a buffer in the memory. This may be a circular buffer, also referred to as a loop table, ring buffer, or circular queue. Specific implementations of a ring buffer are for example a ping pong buffer or a bip buffer.

Figure 6:
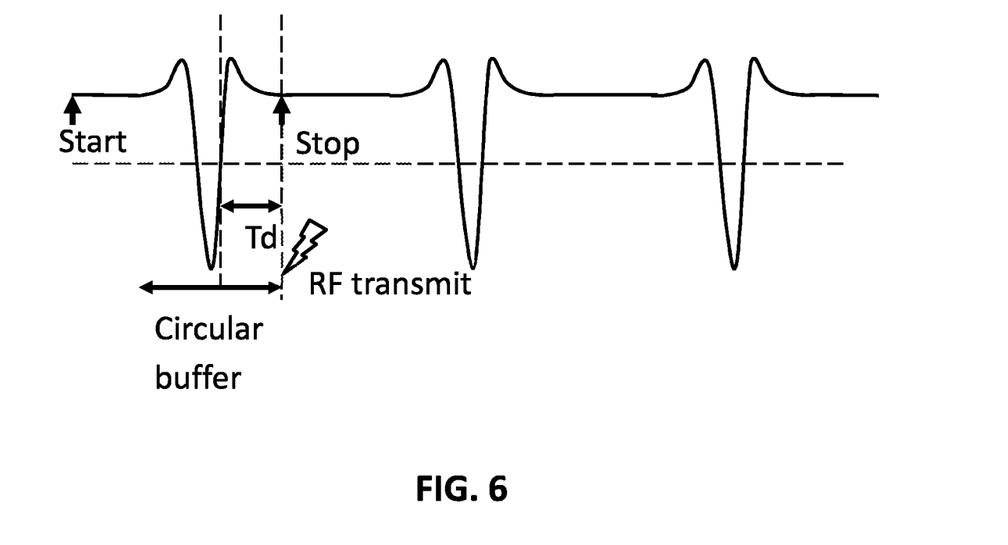
FIG. 6 illustrates the circular buffering of a perturbation, of an axial acceleration signal, according to embodiments of the present invention.
Figure 7:
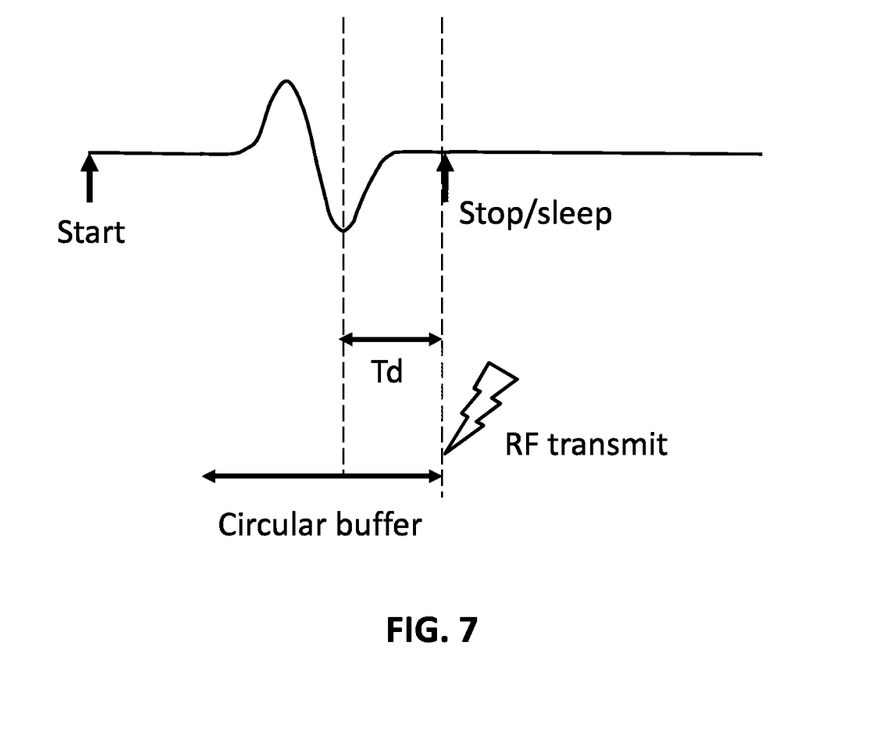
FIG. 7 illustrates the circular buffering of a perturbation, of an tangential acceleration signal, according to embodiments of the present invention.

By comparing the stored data with at least one characterizing feature of a perturbation induced by a contact patch the acquisition system 120 determines whether the perturbation is present in the data in the buffer. In embodiments of the present invention data is stored in the buffer until a transmit delay after a perturbation in the data is recognized. It is thereby advantageous that the first perturbation after starting the acquisition is acquired. In FIGS. 6 and 7 possible acquisitions of the perturbation are illustrated. The characterizing features of the perturbation can be recognized. Thus, it is possible to acquire the perturbations. In these graphs the oscillations which are dependent on the tire tread depth are not visible. These curves are obtained if the sample rate is not high enough to monitor the tire tread dependent oscillations.

In embodiments of the present invention the transmit delay may be zero. In embodiments of the present invention the transmit delay is selected depending on the perturbation duration. It may for example be proportional to the perturbation duration. In embodiments of the present invention the buffer may be a circular buffer. The size of the circular buffer may be such that data of the perturbation (including the transmit delay and a period before the perturbation) can be stored in the circular buffer. This is illustrated in FIG. 6 showing a sequence of perturbations, of which the first perturbation is stored in the circular buffer until a transmit delay $T_d$ after the detection of the trailing edge of the perturbation. At the start moment the tire measurement system, according to embodiments of the present invention, wakes up and triggers the acquisition system to acquire data from the sensor. The start of acquisition is indicated by the first vertical dashed line. A transmit delay ($T_D$) after the perturbation in the data is recognized the buffering is stopped. This moment is indicated by the second vertical dashed line. In this example the transmit delay starts from the moment the trailing edge of the perturbation crosses the trailing edge threshold. The data between the dashed lines is stored in the (circular) buffer. The two subsequent perturbations in the trace in FIG. 6 are not sampled by the sensor system (this is, however, not required). Only after a certain period of time the sensor system will wake up again and acquire a new perturbation. By increasing this period, the power consumption of the tire measurement system will decrease. The acquisition system 120 may be adapted to acquire a plurality of these perturbations and for processing the plurality of these perturbations. Thus, a better estimation of the tire tread depth can be obtained.

FIG. 7 shows a diagram of a contact patch induced perturbation generated by an acceleration sensor which is sensitive to tangential acceleration wherein the perturbation is recognized by means of peak detection. The tangential acceleration corresponds with the acceleration along the x-axis in FIG. 1. In this exemplary embodiment the perturbation is recognized by detecting the second peak. The characterizing feature may for example be a threshold for determining the second peak or an expected shape of the second peak which can be correlated with the measured data. In embodiments of the present invention the perturbation may be recognized by detecting the first peak and the second peak. In that case the characterizing features relate to the first peak and the second peak. A delay after the perturbation is recognized, the acquisition is stopped.

In embodiments of the present invention the acquisition system is continuously filling the buffer with the data until the perturbation is recognized by comparing it with at least one characterizing feature of the perturbation. A leading and a trailing edge of the contact patch may for example be detected in the (circular) buffer (e.g. when the perturbation is a pulse with a leading edge and a trailing edge). In that case the characterizing features of the perturbation comprise leading edge and/or trailing edge conditions of a perturbation related to the occurrence of a contact patch. These leading edge and/or trailing edge conditions may for example be thresholds. The leading edge may for example be detected when a predefined leading edge threshold is crossed by the data and the trailing edge may be detected when the trailing edge threshold is crossed by the data. When the leading edge and the trailing edge are determined, the perturbation is present in the buffer. The leading edge may for example be a falling edge and the trailing edge a rising edge. Other features of the perturbation, such as for example a peak, may be used for recognizing the perturbation. Peak detection can for example be used in case of a sensor which produces a tangential acceleration signal.

In embodiments of the present invention comparing the stored data with at least one characterizing feature of the perturbation may comprise processing the data. The processing may for example comprise performing a Fast Fourier Transform (FFT) on the data. The at least one characterizing feature of the perturbation is in that case a characterizing feature of the processed data (for example an edge or a peak in the processed data).

In embodiments of the present invention the sensor system 100 is adapted for going into low power mode in between perturbation acquisitions. In such sensor systems 100 the sensor system wakes up and triggers the acquisition system to acquire the data from the sensor. The acquisition system is adapted for acquiring the data and for storing it in the buffer. In case of a circular buffer, this buffer may for example achieved by filling a loop table until the end of the table, after which the loop table is filled from the beginning. In general a circular buffer may be achieved by filling the buffer until it is full and from then onwards by overwriting the oldest sample with the newest sample. This is done continuously until a perturbation in the data, which is caused by a contact patch, is detected in the loop table (e.g. until the leading and trailing edge are detected in the data, or until a peak is detected in the data, or any other characterising feature of the perturbations).

As described above, the acquisition system may wait for a transmit delay to ensure that the full patch is acquired (this is an optional feature). This delay may for example depend on the duration of a patch related perturbation (T patch).

After acquiring the perturbation and transmitting the at least one oscillation or a processed version thereof, the tire wear estimator goes to sleep mode, resulting in a reduced power consumption.

A tire measurement system according to embodiments of the present invention may be battery powered. Alternatively an energy harvester may be used for powering the tire measurement system. It is advantageous that the tire wear estimator goes into sleep mode after transmitting the at least one oscillation or a processed version thereof as this will result in reduced power consumption.

Figure 8:
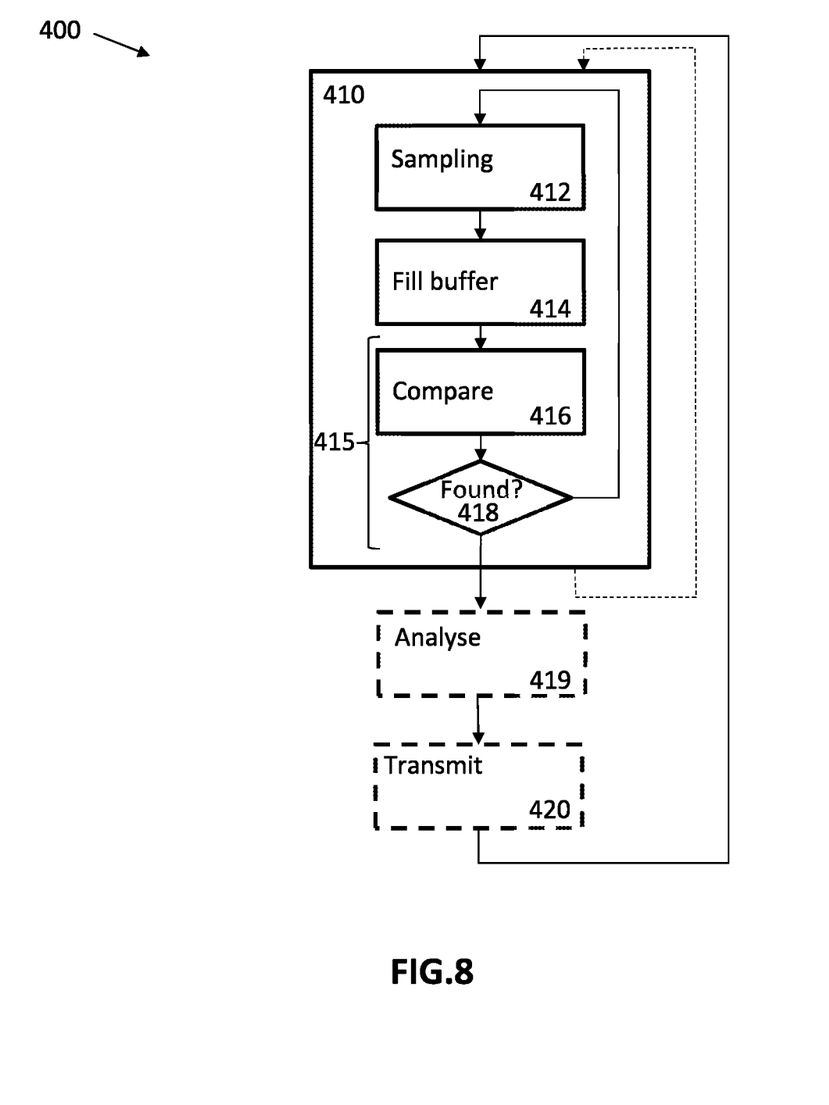
FIG. 8 shows a flow chart of an exemplary method, wherein the data may be analyzed after which the analyzed result is transmitted, in accordance with embodiments of the present invention.
Figure 9:
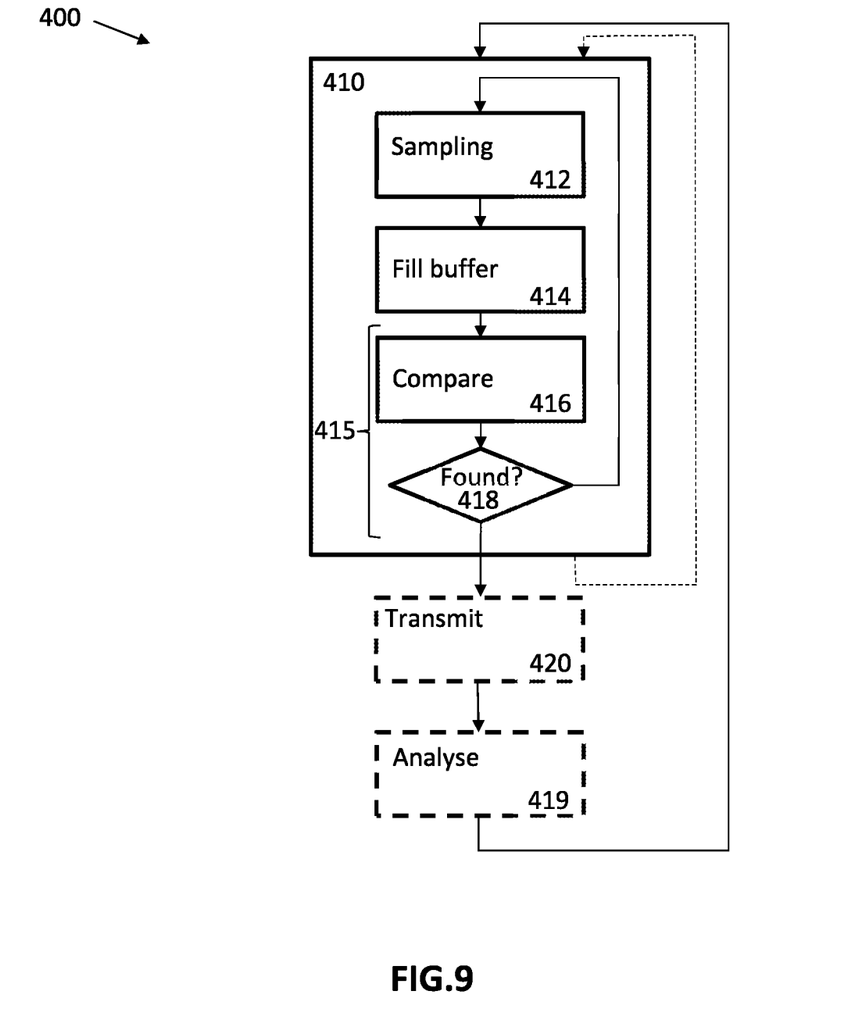
FIG. 9 shows a flow chart of an exemplary method, wherein the data is transmitted after which it may be analyzed, in accordance with embodiments of the present invention.

In a second aspect embodiments of the present invention relate to a method 400 for estimating tire wear. Flow charts of exemplary methods according to embodiments of the present invention are shown in FIGS. 8 and 9.

Methods according to embodiments of the present invention comprise a step sampling 412 data of the sensor 110, which is mounted in or on an inner surface of a tire, and which is adapted for sensing a physical property of the tire. While sampling the data a buffer is filled 414 with the sampled data.

When the part of the tire where the sensor is mounted hits the ground this results in a perturbation of the sampled data. Methods in accordance with embodiments of the present invention are adapted for identifying 415 this perturbation in the sampled data. Data around the perturbation (i.e. before the beginning and/or after the end of the perturbation) may be acquired.

In embodiments of the present invention the sampling 412 is done at a sample rate which is high enough such that at least one oscillation, which is indicative of the tire tread depth, becomes detectable in the sampled data in and/or around the perturbation.

Methods according to embodiments of the present invention may comprise transmitting 420 the sampled data which comprises the at least one oscillation which is indicative of the tire tread depth or a processed version of the sampled data.

In embodiments of the present invention sampling 412 the data may for example be done at a rate of at least 200 samples/second.

In embodiments of the present invention the method moreover comprises estimating a tread depth of the tire by analyzing 419 the at least one oscillation in and/or around the perturbation. This may be done on a processing unit located outside the tire or on a processing unit located in or on the inner surface of the tire. In the first case the perturbation data is transmitted 420 (see FIG. 9) and the transmitted data is analyzed, and in the last case the analyzed 419 data is transmitted 420 (see FIG. 8)

In embodiments of the present invention identifying 415 the perturbation comprises comparing 416 the data in the buffer with at least one characterizing feature of the perturbation for finding 418 the perturbation in the data.

The invention claimed is:

1. A tire wear estimator, comprising a tire measurement system which is adapted to be mounted in a tire or on an inner surface of a tire, the tire measurement system comprising a sensor adapted for sensing a physical property of the tire, and an acquisition system adapted for sampling a signal of the sensor into memory to acquire a perturbation in the sampled data which is induced by a contact patch of the tire when a part of the tire where the sensor is mounted hits the ground, wherein the sensor is an acceleration sensor adapted for measuring radial acceleration and/or for measuring tangential acceleration and wherein the acquisition system is adapted for sampling at a sample rate that allows at least one oscillation, which has a characteristic frequency of 200 Hz or more, which is indicative of a tread depth of the tire, to become detectable in the sampled data in and/or around the perturbation, wherein the sample rate is at least 400 samples per second.

2. The tire wear estimator according to claim 1, the tire measurement system, moreover, comprising a communication system for wireless data transmission.

3. The tire wear estimator according to claim 2, the tire wear estimator moreover comprising a processing unit adapted for estimating a tread depth of the tire by analyzing the at least one oscillation which is indicative of the tire tread depth.

4. The tire wear estimator according to claim 3, wherein the communication system is adapted for wirelessly transmitting the perturbation to the processing unit and wherein the processing unit is adapted to be located outside the tire.

5. The tire wear estimator according to claim 3, wherein the processing unit is adapted to be mounted in or on the inner surface of the tire and wherein the communication system is adapted for wirelessly transmitting the estimated tread depth.

6. The tire wear estimator according to claim 3, wherein the processing unit is adapted for analyzing the amplitude of the at least one oscillation for estimating the tread depth and/or wherein the processing unit is adapted for analyzing the frequency or period of the at least one oscillation for estimating the tread depth.

7. The tire wear estimator according to claim 1, the acquisition system comprising an analog to digital converter for sampling the signal of the sensor.

8. The tire wear estimator according to claim 1, wherein the sensor is adapted for measuring radial acceleration.

9. The tire wear estimator according to claim 1, wherein the sensor is adapted for measuring tangential acceleration.

10. The tire wear estimator according to claim 1, wherein the acquisition system is adapted to acquire the perturbation by storing the sampled data in a buffer in the memory, until a transmit delay after the perturbation is recognized, wherein the perturbation is recognized by comparing the stored data with at least one characterizing feature of the perturbation.

11. The tire wear estimator according to claim 10, wherein the at least one characterizing feature of the perturbation comprises leading edge and/or trailing edge conditions of the perturbation.

12. A method for estimating tire wear, the method comprising:
sampling data of an acceleration sensor, which is mounted in or on an inner surface of a tire, and which is adapted for sensing a physical property of the tire;
filling a buffer with the sampled data;
identifying a perturbation in the sampled data, which is induced when a part of the tire where the sensor is mounted hits the ground; and
wherein radial acceleration and/or tangential acceleration is measured and wherein the sampling is done at a sample rate that allows at least one oscillation, which has a characteristic frequency of 200 Hz or more, which is indicative of a tire tread depth, to become detectable in the sampled data in and/or around the perturbation, wherein the sample rate is at least 400 samples per second.

13. The method according to claim 12, the method moreover comprising transmitting the sampled data which comprises the at least one oscillation or a processed version of the sampled data.

14. The method according to claim 12, the method moreover comprising estimating a tread depth of the tire by analyzing the at least one oscillation in and/or around the perturbation.

* * * * *